United States Patent Office 3,278,718
Patented Oct. 11, 1966

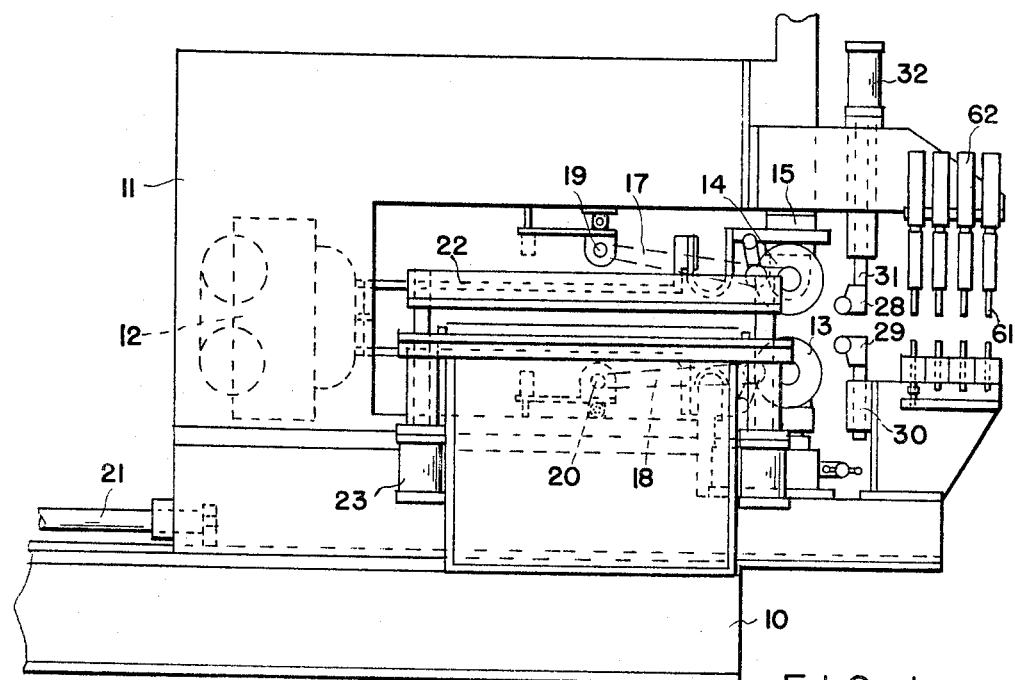
FIG. 1
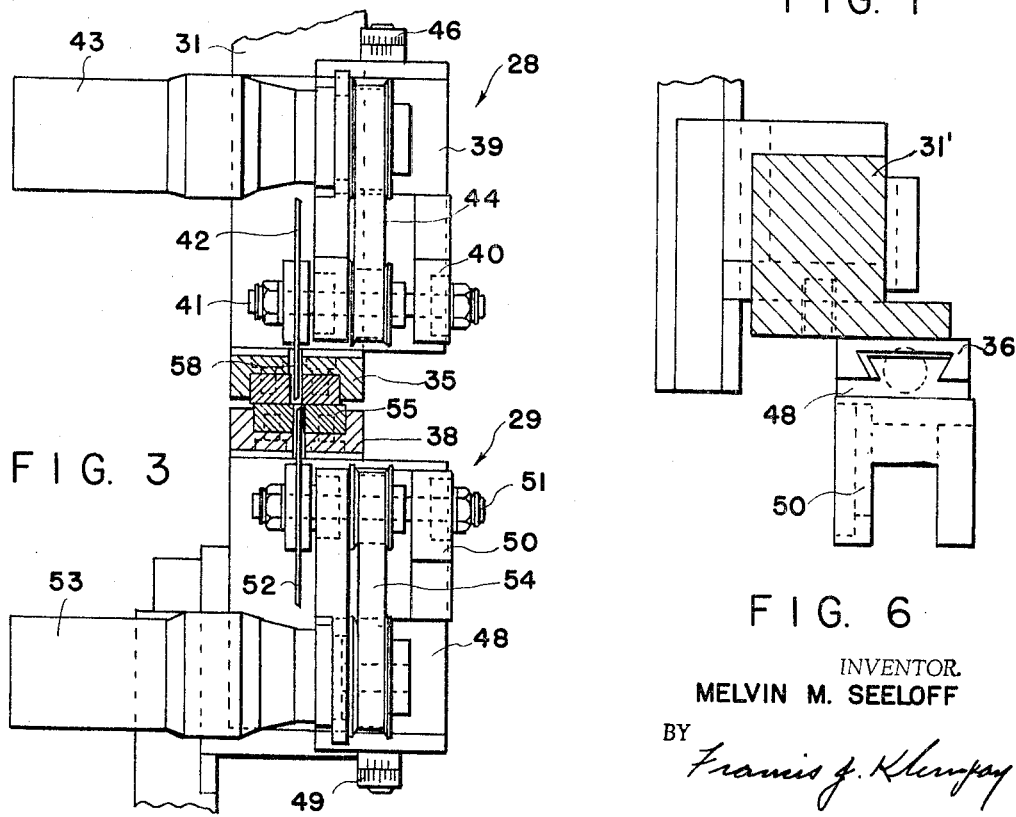
FIG. 3
FIG. 6
INVENTOR.
MELVIN M. SEELOFF
BY Francis J. Klempay
ATTORNEY Oct. 11, 1966   M. M. SEELOFF   3,278,718
APPARATUS FOR JOINING METAL SHEET OR STRIP
Filed Oct. 9, 1964                                 2 Sheets-Sheet 2
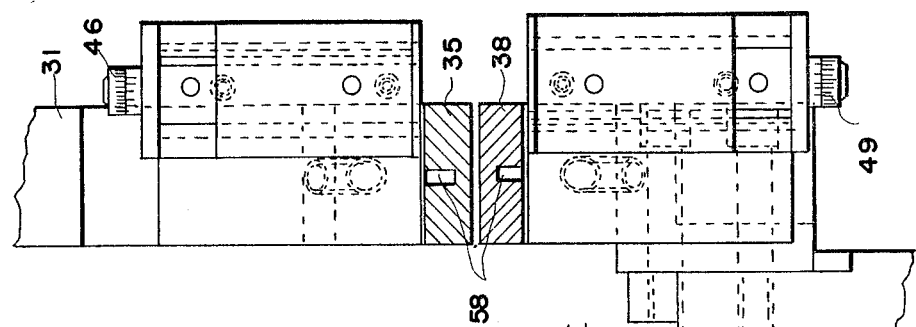
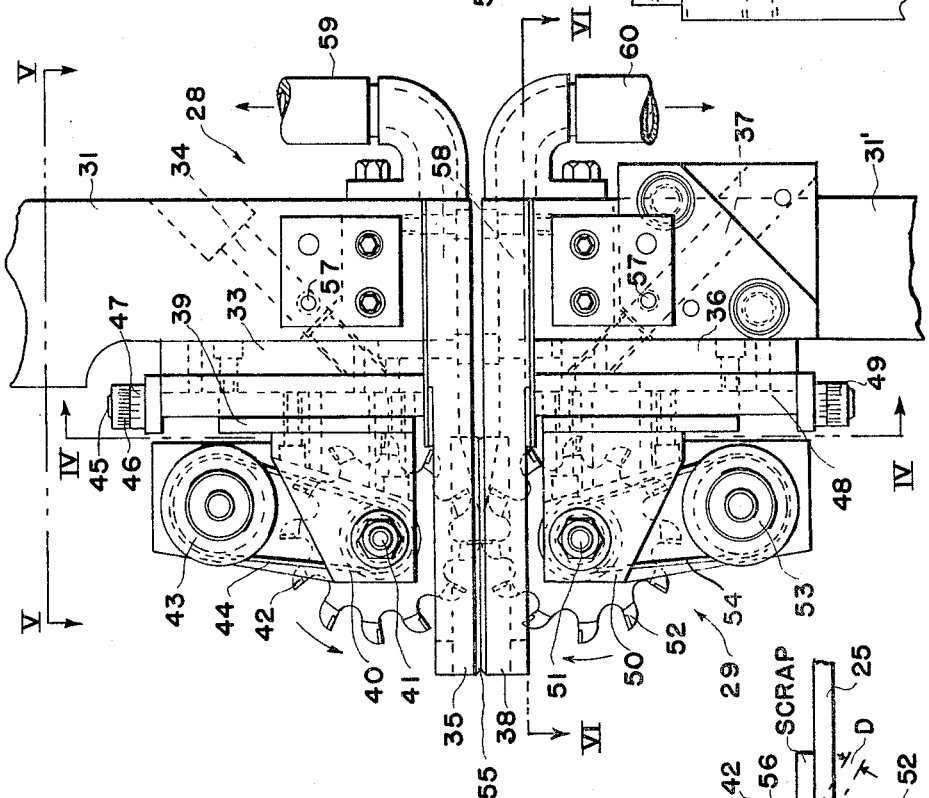
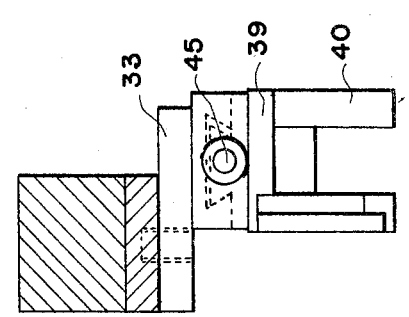
INVENTOR.
MELVIN M. SEELOFF
BY Francis J. Klempay
ATTORNEY

3,278,718
APPARATUS FOR JOINING METAL SHEET
OR STRIP
Melvin M. Seeloff, Warren, Ohio, assignor to The Taylor-Winfield Corporation, Warren, Ohio, a corporation of Ohio
Filed Oct. 9, 1964, Ser. No. 402,704
12 Claims. (Cl. 219—82)

This invention relates to the art of joining metal sheet or strip in general edge-to-edge or end-to-end relation and while having special application to the joining of workpieces made of the softer metals, such as aluminum, it may also be used for joining steel strip or sheets of the thinner gauges. The primary object of the present invention is to provide improved and practical apparatus for carrying out the method more fully disclosed and claimed in my co-pending application Serial No. 402,705 filed October 9, 1964.

As pointed out in the above said co-pending application, the most practical method of joining metal sheets or strip in edge-to-edge or end-to-end relation, particularly in the softer metals and thinner gauges, is to effect electric resistance seam welds of overlapped portions of the workpieces. If consistently good weld results are to be obtained, however, the overlap must extend well to either side of the line of weld. In some end products, it is desired that the entire weld area or zone be reduced in thickness to substantially down to the thickness of one or the other of the parent workpieces. Thus necessitating the removal of most of the excess overlap before the welded joint is peened or rolled down to reduce its thickness. Some proposals have heretofore been made for doing this but none have been successful at the speeds desired in modern production equipment. Accordingly, a more specific object of this invention is to provide improved and practical apparatus to be used with electric resistance seam welding apparatus which establishes a continuous and uniform weld nugget between overlapped portions of the workpieces for the purpose of removing the excess overlap thereby enabling the welded joint to be peened or planished down to a flat thickness substantially equal to the thickness of one or the other of the workpieces.

A further object of the invention is the provision of improved and practical apparatus for the purpose recited above which operates with a minimum of force and in such manner that there is no disturbance of the weld nugget or its planes of fusion with the parent metal or of the metal workpieces themselves on either side of the weld. Thus, even though the complete joining sequence proceeds at a rapid speed, the weld remains of the high quality and consistency which is possible of the seam welding method and no damage is done to the basic nature of the product by the subsequent peening or planishing cycle. In accordance with the principles of this invention, this object is accomplished by the use of shaped, high-speed and power-driven milling cutters which follow close behind the welding wheels to sever the excess overlap or scrap from the workpieces in a smooth and precise manner.

The above and other objects and advantages of the invention will become apparent upon consideration of the following specification and the accompanying drawing wherein there is disclosed a preferred embodiment of the invention.

In the drawing:

FIGURE 1 is a schematic showing of a complete sheet or strip joining machine which utilizes the principles of the present invention;

FIGURE 2 is a side elevation of the apparatus of the present invention which is used in the assembly of FIGURE 1;

FIGURE 3 is an end elevation, partly in section, of th apparatus of FIGURE 2;

FIGURES 4, 5, and 6 are sectional views of the apparatus of FIGURES 2 and 3, these views being taken along the lines IV—IV, V—V, and VI—VI, respectively, of FIGURE 2; and FIGURE 7 is a fragmentary view showing the function of the present apparatus.

In FIGURE 1, reference numeral 10 designates the base of a seam welding machine for strip, this machine having a large C-shaped housing 11 which is slideable on the base right to left as viewed in the figure. Housing 11 carries a welding transformer 12, one secondary terminal of which is connected to a seam welding wheel or electrode 13 suitably mounted on the bottom leg of the housing 11. The other secondary terminal is suitably connected to an upper seam welding wheel or electrode 14 which is carried by a quill or slide 15 guided in the upper leg of the housing 11. Suitable means, not shown herein but well known in the art, is provided to raise and lower the carrier 15 and to transmit welding pressure therethrough. A slip drive 19, operating through belt 17, drives the wheel 14, while a similar drive 20, acting through belt 18, drives the wheel 13. These are light drives and are provided only for the purpose of preventing slippage of the wheels on the work, the screw 21 being provided to slideably move the housing 11. When making a weld, one of the strip lengths is held by a clamp 22 operated by cylinders 23 which clamp is rigid with respect to the base 10, and it will be understood that another similar clamp (not shown herein) also carried by the base 10 but on the far side of the line of weld defined by the path of the wheels 13, 14, is provided to clamp the other of the strip lengths. These strip lengths are indicated by reference numerals 24 and 25 in FIGURE 7 and are overlapped in the weld throat of the machine as shown in this figure so that upon the wheels 13, 14 making their welding traverse a weld nugget 26 will be established between the overlapped strip portions.

Also, in FIGURE 1, there is schematically shown an upper milling cutter head 28 and a lower milling cutter head 29 which follow along behind the welding wheels during a welding traverse and which are shown in detail in FIGURES 2 thru 6 of the drawing. It should be noted, however, that the lower cutter assembly 29 is adjustably carried by a bracket 30 mounted on the lower leg of the C-shaped housing 11 while the upper cutter assembly 28 is carried by a vertically guided slide 31 operated by a cylinder 32.

As shown in FIG. 2, the upper cutting unit 28 is carried by an L-shaped bracket 33 which is arranged to be rigidly clamped onto a lower corner of the carrier 31 by means of a bolt, not shown, which fits into the angled hole 34. For a purpose to be later described, the hole in carrier 31 to receive this bolt is made slightly larger than the bolt so that the bracket 33 may be adjusted a slight amount along the edge or corner of the carrier 31. The bottom part of the bracket 33 comprises a bar 35 having the cross sections shown in FIGURES 3 and 4. The lower cutting assembly 29 is similarly mounted having a bracket 36 which is adapted to be clamped to the upper edge of a carrier 31' by a single bolt, not shown, which can be fitted in the hole 37. The top reach of the bracket 36 comprises a bar 38 having the cross section shown in FIGURES 3 and 4.

Dove-tailed for vertical sliding movement on the vertical leg of the bracket 33 is a slide 39 having a pair of spaced forwardly extending ears 40 to antifrictionally journal a small spindle 41. Rigidly mounted of this spindle outwardly of one of the ears is a milling cutter 42, the teeth of which are shaped (angled) as indicated in FIGURE 7. Mounted on one of the ears 40 above the milling cutter 42 is a small electric or air motor 43 which is arranged to drive the spindle 41 through a small timing belt 44. A screw 45 is journaled in the bracket 33 and has screw-threaded connection with the slide 39 so that the slide may be raised and lowered with micrometric accuracy. For this purpose, a micrometer indicator 46 is attached to the top of the screw 45 to cooperate with the reference disk 47 which is attached to the bracket 33.

The lower cutter unit is constructed similarly to the upper unit above described, having a slide 48 which is adjustably mounted on the bracket 36 for adjustment by the micrometer screw 49. Again, the slide 48 has forwardly extending brackets or ears 50 in which is antifrictionally journalled a spindle 51. An overhanging end of this spindle mounts a milling cutter 52 which is similar to the cutter 42, having its teeth shaped as shown in FIGURE 7. A small electric or air motor 53 is mounted on one of the ears 50 for driving the spindle 51 through a small timing belt 54.

As shown in FIGURE 3, the bars 35 and 38 are recessed in their facing surfaces to receive wear shoes 55, one on each side of each of the cutters 42 and 52. As shown in FIGURE 2, these shoes 55 extend considerably ahead of the milling cutters so that at the start of a welding traverse the energization of the cylinder 32 may be timed to bring the shoes 55 into light pressure contact with the welded and overlapped work before the cutters 42, 52 engage the work.

Considering now the functioning of the above described apparatus, its purpose is to accurately sever the excess overlaps or scrap from the welded stock as indicated in FIGURE 7. In actual practice and in accordance with the method disclosed in the above referenced co-pending application, the scrap is severed closely outside the weld nugget 26 and along angled planes 56 which are parallel to each other and spaced apart only slightly more than the thickness of either of the workpieces 24, 25. Also, as pointed out in the aforementioned application, it is desirable that the lines of cut terminate just short of the inner surfaces of those portions of the workpieces which remain about the weld after the scrap is removed so as to avoid any scoring of these inner surfaces. The present invention enables this to be done with micrometric accuracy due to their referencing of the cutting edges of the teeth of the cutters 42, 52 to the work engaging surfaces of the shoes 55, which referencing may be readily accomplished by the micrometer screws 45 and 49. It should be understood that in actual practice the air pressure admitted to the upper end of cylinder 32 is controlled so that a light clamping pressure is maintained between the shoes 55 and the work during the welding traverse.

To regulate the thickness (D in FIG. 7) of the angled and welded interconnection between the workpieces 24, 25 as well as to allow for different widths of weld nuggets which results from different metals and gauges it is desirable that provision be made to displace the cutters 42, 52 along the axes. For this purpose I may provide adjusting screws, not shown, which fit into tapped holes 57 (FIG. 2) for engagement against the sides of the shanks of the clamping bolts for the brackets 33 and 36. Since these shanks are loosely fitted in the holes 34 and 37 a limited amount of sideways movement of the brackets 33 and 36 is permitted. Of course, other expedients readily available to a skilled designer may be used to shift the cutter assemblies in the direction of the axes of the cutter spindles.

In the practical operation of the overall apparatus, the milling cutters 42, 52 operate at high speed and displace considerable metal in the form of fine chips which must be removed to prevent clogging of the milling apparatus. I accomplish this by providing slots 58 (FIGS. 2, 3 and 4) in the outer faces of the bars 35 and 38 which slots extend from the spaces between the shoes 55 to the rear ends of the bars 35 and 38. These slots discharge into exhaust fittings 59 and 60 which are mounted on the carriers 31 and 31', respectively. Suction is maintained on these fittings 59 and 60 to draw away the cuttings and chips as the milling cutters traverse the welded stock.

In FIGURE 1, reference numeral 61 designates peening hammers which are operated by air motor 62 to peen down the weld after the scrap has been severed by the cutters 42, 52. The severance may be complete in some materials while in others a thin feathered connection may be left but this is so thin that the scrap may readily be removed by hand or by a simple plow device. However done, the scrap is moved to outside the path of travel of the peening hammers 61 before the latter engage the work. The peening sequence may follow the welding and severing directly or it may take place on the return stroke of the housing 11. Also, the peening hammer or hammers may be replaced with a planishing roll or rolls.

Having thus described my invention what I claim is:

1. In combination with a traveling head electric resistance seam welder having a pair of spaced workpiece clamps and welding wheels movable between said clamps to effect a continuous weld nugget between overlapped workpieces held in said clamps, means for severing excess overlapped portions of said workpieces outwardly of said nugget, said means being carried by said movable head and comprising power-driven milling cutters engaging the overlapped and welded stock on opposite sides thereof, said cutters having peripheral cutting surfaces which are angled outwardly of the plane of the workpieces in the direction of the overlap, and means also carried by said head to flatten down the welded and overlapped stock after removal of said excess portions.

2. Apparatus according to claim 1 further including a power drive for each of said milling cutters, and means adjustably mounting the respective cutters with their drives on said traveling head for movement toward and away from each other whereby the depths of cut of said cutters into the overlapped and welded stock may be varied.

3. Apparatus according to claim 2 further including means to vary the spacing of said cutters along their axes of rotation whereby the location and spacing of the lines of cut on the opposite surfaces of said overlapped and welded workpieces may be varied.

4. For use in an electric resistance seam welder which is operative to impart a continuous weld nugget between two overlapped workpieces a pair of cutter assemblies for severing excess overlap from the workpieces outwardly of said nugget, each of said assemblies comprising a carrier and a wear shoe adapted to ride on a surface of the overlapped and welded stock, means to move said carriers toward and away from each other and to apply pressure therethrough whereby said shoes may have controlled clamping pressure on said work, and each of said assemblies comprising a power-driven milling cutter adjustable with respect to its carrier and shoe whereby the cutting projection of the cutter outwardly of the clamping surface of the shoe may be controlled, said cutters having peripheral cutting surfaces which are angled outwardly of the plane of the workpieces in the direction of the overlap.

5. Apparatus according to claim 4 further characterized in that each of said carriers includes a chamber communicating with a peripheral portion of the cutter mounted on the carrier to entrap the metal chips created by said cutters, and means to remove the said chips from said chambers.

6. Apparatus according to claim 5 further characterized in that said means to remove the chips from said chambers comprises suction lines having port fittings secured to and carried with said carriers.

7. For use with an electric resistance seam welder operative to seam weld together overlapped portions of two sheet or strip workpieces means to sever the excess overlaps from said workpieces which are outside the line of well comprising opposed cutting units and means to move the same away from each other and toward each other under controlled force, each of said units having a carrier and a subassembly of a milling cutter and a driving motor adjustably mounted on the carrier, each of said units having gauging means for riding on the surface of the overlapped welded stock, said subassemblies being adjustable to vary the penetration of the cut of said cutters outwardly of said gauging means, and said milling cutter having a peripheral cutting portion which is angled away from the plane of the workpieces in the direction of the overlap thereof.

8. Apparatus according to claim 7 further including means to shift the positions of said cutters along their respective axes whereby the lines of cut on the opposite surfaces of the welded and overlapped work may be relocated and varied as to spacing.

9. In apparatus for severing excess overlap from a workpiece which has been electric resistance seam welded to a second workpiece in overlapped relation the combination of means to clamp said welded workpieces in fixed position, a carrier normally fixed with respect to said clamp means and having an end surface generally parallel with the workpiece and a side surface generally normal to said end surface, a bracket having angularly related legs overlying said surfaces and rigidly connected thereto, the leg of said bracket which is in contact with said first mentioned surface comprising a bar with a slit therein which is opened to the work, a slide adjustably mounted on the other of said legs of the bracket for movement toward and away from the work, an assembly of a milling cutter and driving motor mounted on said slide, the milling cutter of said assembly projecting through said slit, and means to move said slide whereby the projection of said cutter through said slit may be varied.

10. Apparatus according to claim 9 further including an adjusting screw having a micrometer indicator for adjusting the slidable position of said slide on said other leg to thereby vary the projection of the milling cutter through said slit.

11. Apparatus according to claim 9 further characterized in that said bar is recessed inwardly from its face which is exposed to said work on either side of said slit, and a pair of wear shoes received in said recesses and adapted to have sliding contact with the work, the arrangement being such that the depth of penetration of the milling cutter into the work is thus accurately controlled.

12. Apparatus according to claim 9 further characterized in that said bar has a continuous passage therein extending from said slit to one end of the bar, and a suction line having a port fitting mounted on said carrier and being in communication with said passage whereby metal chips cut out by said cutter are continuously withdrawn from the region surrounding the cutter.

References Cited by the Examiner
UNITED STATES PATENTS

| | | | |
|---|---|---|---|
| 2,143,969 | 1/1939 | Biggert | 219—104 X |
| 2,256,559 | 9/1941 | Harder | 29—923 |
| 2,800,568 | 7/1957 | Cooper | 219—82 |
| 2,892,921 | 6/1959 | Mecklenborg | 219—83 |

RICHARD M. WOOD, *Primary Examiner.*

ANTHONY BARTIS, *Examiner.*

B. A. STEIN, *Assistant Examiner.*